Patented Sept. 22, 1953

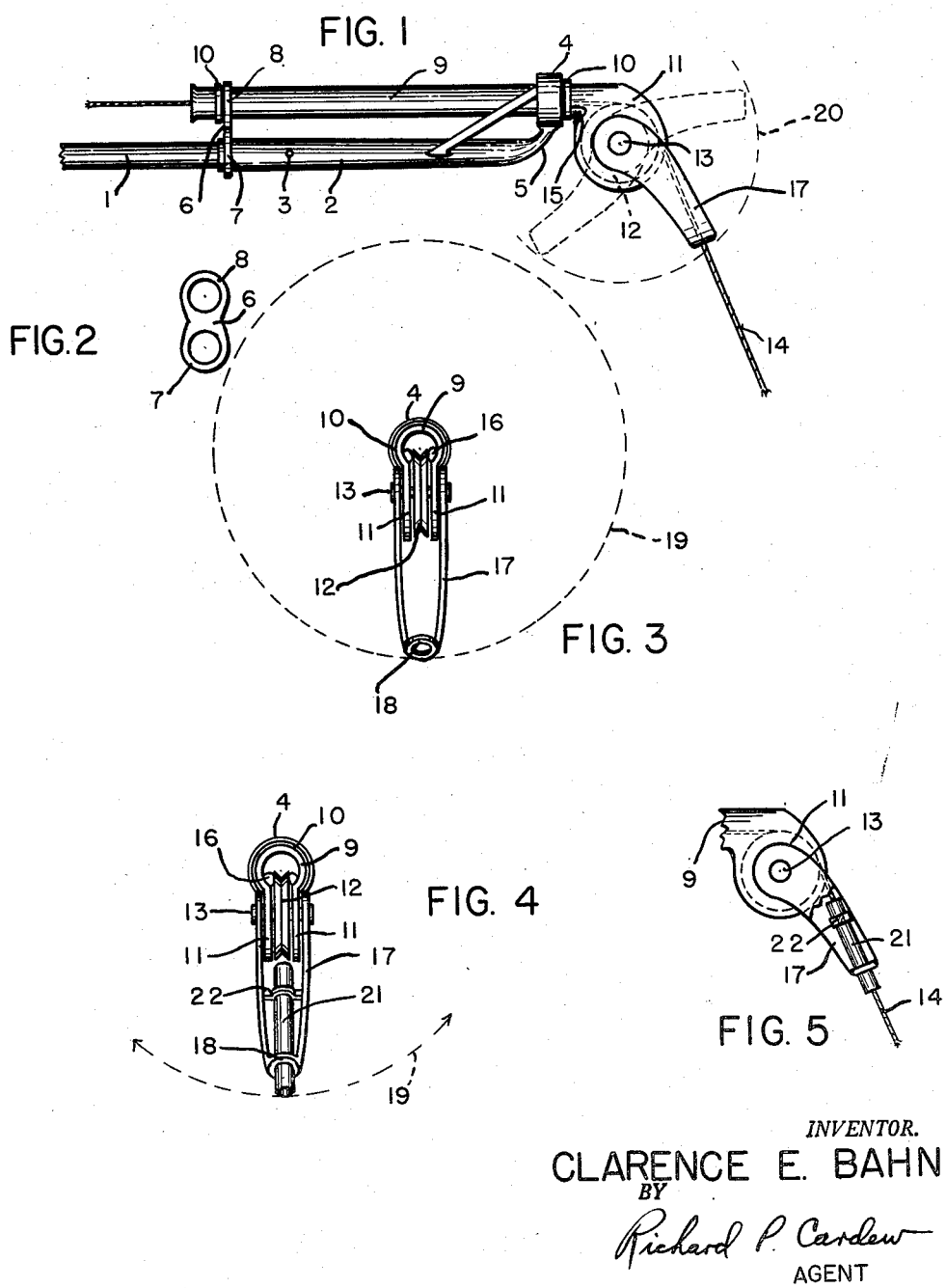

2,652,654

UNITED STATES PATENT OFFICE 2,652,654

FISHING ROD TIP

Clarence Edston Bahn, Duluth, Minn.

Application September 4, 1951, Serial No. 244,984

1 Claim. (Cl. 43—24)

This invention relates to the art of fishing and has special reference to improvements in a tip for a fishing rod.

It is well known that a great deal of annoyance is encountered while fishing because the fishing line becomes fouled or twisted, or becomes wound or caught on the tip end of the rod. This is especially true of deep-sea fishing where heavier tackle is employed, and where copper or other metal line may be used. In order to overcome this annoyance in fishing, many devices have been made and patented; however, none of these have proven entirely successful. Some of these patented devices provide a pulley or sheave at the end of the rod over which the line rides. However, the devices do not function as intended and the fishing lines do not seem to ride the sheave satisfactorily and often get twisted around the end of the rod or the line gets undesirable twists in it which are difficult to remove.

It is also well known that when a fishing line cannot run freely over a pulley, or if it is twisted around the fishing rod, it is not only difficult to let out or reel in line, but also, there is excessive wear and abrasion occurring on the line which may cause the same to break unexpectedly, or, at least, the line will not give proper service.

It is, therefore, one of my principal objects to provide an improved line control means for installation on the outer end of a fishing rod to eliminate the annoying twisting of lines as well as the possibility of the line becoming wound around the end of the rod.

Another object is to provide means for making fishing easier and to lengthen the life of fishing lines.

Another object is to provide such a device of as simple and inexpensive construction as possible.

Another object is to provide a fishing line control having a tubular guide through which the fishing line extends, a sheave at the outer end of the guide over which the line rides, means to retain the line on the sheave, and means mounting the sheave whereby the line cannot become twisted around the fishing rod.

Another object is to provide such a device wherein the tubular line guide is axially rotatable and the sheave is carried by the line guide to rotate therewith and maintain proper line-sheave relationship at all times.

Another object is to provide positive means for insuring the swivel or rotation of the line guide and sheave as the direction of pull on the line changes.

These and other objects and advantages will become more apparent as the description of the invention proceeds.

In the accompanying drawing forming a part of this application:

Figure 1 is a side elevational view of my improved fishing rod tip showing same in operative position on the end of a rod.

Figure 2 is a plan view of one of the mounting plates for the line guide tube.

Figure 3 is an end view of Figure 1.

Figure 4 is a view similar to Figure 3 showing a modified form of my invention.

Figure 5 is a fragmental side elevational view of Figure 4.

In the drawing, the reference numeral 1 indicates the outer end of a fishing rod which is remote from the reel and reel seat, not shown. The numeral 2 indicates a hollow socket member into which the fishing rod is extended or fit to provide means for mounting my rod tip. The socket 2 may be secured on the end of the rod in any desired manner; however, I have here shown a pin 3 which extends through the socket and rod to hold same in assembled relation.

At the outer end of the socket 2 a ring forming a mounting member 4 is carried, preferably by an outwardly and upwardly arched extension 5, the ring being disposed at right angles to socket and having its opening facing in substantially the same direction as the opening in the socket, as may be readily seen from the drawing.

Adjacent the rear or inner end of the socket, a mounting member 6 is fixedly installed in an upstanding position, as by welding or the like, the member 6 having a lower ring 7 therein which surrounds the socket member 2 and permits the fixed installation of the member 6 on the member 2. The member 6 has an upper ring 8 which extends above the socket member in spaced relation to and in substantial axial alinement with the ring 4, as shown.

A tubular line guide 9 is axially rotatably mounted in the mounting rings 4 and 8 in substantial spaced parallel relation to the socket member 2, the guide 9 being held in its desired longitudinal position in the mountings 4 and 8 by means of annular ribs or flanges 10, 10 on opposite sides of the mounting members 4 and 8, as shown. If desired, the ribs or flanges 10 may comprise a ring soldered or sweated in place on the tube 9.

At the outer end of the tubular guide 9 and integral therewith, I provide a pair of spaced, opposed side plates 11, 11, one from each side of the tube 9, the plates being in laterally offset relation to the tube, as shown. A sheave 12 is rotatably mounted intermediate the plates 11, 11 by means of a pin 13 which extends through the plates and the sheave, the sheave being positioned so that the fishing line 14 is in tangential relation to the sheave when the line extends through the approximate center of the tube, as shown in Figure 1.

It is preferred that the intersection of the side plates with the tube be pressed inwardly or indented slightly on each side, as at 15, to form inwardly disposed humps 16 (see Fig. 3), which will aid in keeping the line 14 on the sheave.

To complete my line control means, I provide a pivotal arm 17 which is carried by the pin 13 on the outer faces of the plates 11, 11, as shown, the arm 17 preferably comprising an unitary piece of sheet metal stamped or pressed to the desired U-shape and having an eye 18 at the base or outer end thereof. The arm 17 is preferably arcuately shaped or offset from its pivotal mounting on the pin, as shown, and the fishing line 14 extends through the eye 18.

In operation, with the fishing line mounted as shown in Figure 1, any lateral or up-and-down movement of the fishing rod will cause the tube 9 to swivel in its mountings 4 and 8, as indicated in dotted lines at 19, or will cause the arm 17 to pivot on the pin 13, as shown in dotted lines at 20. The pivotal movement of the arm 17 will compensate for any vertical movement of the fishing rod and maintain the fishing line on the sheave at all times. When the rod is moved laterally in any plane, the arm 17 will insure the swiveling of the tube 9 in its mountings because of its materially offset relation to the tube, whereby considerable leverage is available to cause the swivel of the tube 9 in its mountings.

As may be readily seen, the fishing line cannot possibly become entangled around the fishing rod, as the line is guided over the outer end of the rod in the sheave 12, and the arm 17 and the pivotal mounting of the tube 9 will so guide the line that it cannot become engaged around the end of the fishing rod, either on the rod end thereof or on the outer end of the line beyond the fishing rod.

In Figure 4, I have illustrated a slightly modified form of my invention, wherein an auxiliary line-guiding tube 21 is mounted between the legs of the U-shaped arm 17, as by a bracket 22. The other end of the tube 21 extends through the eye 18, as shown, to provide an extended line guide beyond the sheave to insure the line's remaining on the sheave.

It is to be understood that I have herein shown and described one specific embodiment of my invention, and that my appended claim is not necessarily limited specifically thereto, but should be construed as broadly as permissible in view of the prior art.

Having thus described my invention, what I claim is:

A tip for mounting on the end of a fishing pole to control the action of a fishing line comprising an elongated tubular socket member for connection to the forward free end of the fishing rod, an elongated tube in spaced, substantially-parallel relationship with and above said socket member and extending from a point adjacent the rear point of said socket member forwardly to a point forward of said forward end of the fishing rod, spaced upright mounting means mounted on and adjacent to each end of said socket member for supporting the ends of said elongated tube for axial rotation therein, a sheave carried on the forward end of said tube and having its periphery in substantially tangential relation to the axis of rotation of said tube whereby a fishing line extending through said tube will pass around said sheave, a pair of plate members extending laterally from said tube adjacent its forward end in substantially-parallel relation to each other to rotatably support said sheave, an elongated arm pivotally mounted in said plate members for movement in a plane parallel with said sheave, and an eye at the opposite end of said arm through which said line extends, said arm being movable by the raising and lowering of said pole to insure proper relationship between said sheave and the line irrespective of the angle at which said pole is held, and said tube being rotatable by said arm whereby said sheave is constantly maintained in its desired operating alignment with the fishing line irrespective of lateral and vertical movement of said pole or line.

CLARENCE EDSTON BAHN.

References Cited in the file of this patent

UNITED STATES PATENTS

| Number | Name | Date |
| --- | --- | --- |
| 274,036 | Rowe | Mar. 13, 1883 |
| 2,324,353 | Berry | July 13, 1943 |